(12) United States Patent
Lee

(10) Patent No.: US 8,945,661 B1
(45) Date of Patent: *Feb. 3, 2015

(54) SNACK MANUFACTURING PROCESS

(71) Applicant: Sang Gen Lee, La Crescenta, CA (US)

(72) Inventor: Sang Gen Lee, La Crescenta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/220,075

(22) Filed: Mar. 19, 2014

Related U.S. Application Data

(63) Continuation of application No. 13/491,536, filed on Jun. 7, 2012, now Pat. No. 8,715,768.

(51) Int. Cl.
*A23B 7/022* (2006.01)
*A23L 1/212* (2006.01)

(52) U.S. Cl.
CPC .................. *A23L 1/2123* (2013.01)
USPC ........................... 426/640; 426/615; 426/102

(58) Field of Classification Search
CPC ....... A23L 1/0011; A23L 1/212; A23L 1/005; A23L 1/00
USPC .................................................. 426/615, 640
See application file for complete search history.

(56) References Cited

PUBLICATIONS

Feng: CN 101142959 A; Mar. 19, 2008.*
Kendall: Drying Fruits; Colorado State University Extension No. 9.309; printed Aug. 1994.*
Liang: CN 101283759 A; Oct. 15, 2008.*
Yang: KR 943055 B1; Feb. 18, 2010.*
Hoffstetler: Jun. 9, 2008; http://web.archive.org/web/20080609045547/http://frugalliving.about.com/od/foodsavings/ht/Dehydrate_Foods.htm.*
Gao: CN 101147619 A; Mar. 26, 2008.*
Morton: 1987. Indian Jujube. p. 272-275. In: Fruits of warm climates.*
Fang: Hot air drying of whole fruit Chinese jujube (*Zizyphus jujuba* Miller): thin-layer mathematical modeling; International Journal of Food Science and Technology 2009, 44, 1818-1824.*
Ik: KR 2012000831 A; Jan. 4, 2012.*
NIH: Dietary Ingredient: *Ziziphus jujuba*; National Institute of Health; Dietary Supplement label Database; A Joint Effort of the Office of Dietary Supplements and the U.S. national Library of Medicine; Version 5.3.5—May 2013—Rev 330 (602145cee187); http://dsld.nlm.nih.gov/dsld/Ingredient.jsp?item=Ziziphus+jujuba&grpid=415.*
SHF: http://simplyhealthyfam.blogspot.com/2010/07/storing-and-drying-fresh-figs.html; published online at least Jul. 7, 2010 as noted in the comment section.*

* cited by examiner

*Primary Examiner* — Patricia George
(74) *Attorney, Agent, or Firm* — QuickPatents; Kevin Prince

(57) ABSTRACT

A snack-making process for manufacturing jujube snacks includes the following steps. Jujube fruit is harvested from a certain elevation above sea level. The fruit is air dried for between 30 and 120 days with substantially daily exposure to sunlight. The fruit is rinsed with water and air dried naturally between 30 and 60 minutes. The seeds are removed from the fruit and sliced into annular slices. The slices are baked for between 240 minutes to 360 minutes at a temperature of between 142 and 194 degrees F. The slices are cooled for between 30 minutes to 60 minutes at a temperature of between 50 and 60 degrees F. The slices are then cooled to below 15 degrees F. while maintaining the water content of the slices to less than 5%. The snack-making process may include the step of introducing a flavoring substance to the slices.

2 Claims, 3 Drawing Sheets

SNACK MANUFACTURING PROCESS

CROSS-REFERENCE TO RELATED APPLICATIONS

This is a Continuing Application claiming priority to parent U.S. patent application Ser. No. 13/491,536, now U.S. Pat. No. 8,715,768, filed Jun. 7, 2012.

STATEMENT REGARDING FEDERALLY SPONSORED RESEARCH AND DEVELOPMENT

Not Applicable.

FIELD OF THE INVENTION

This invention relates to snacks, and more particularly to a dried jujube chip snack.

BACKGROUND OF THE INVENTION

Jujubes, also known as Korean dates or Chinese dates, are healthy fruits used in cultures across the world. Jujubes are used to make teas and medicines and also eaten directly as a snack. A fresh jujube contains approximately 20%-35% natural sugar and a dried jujube contains 25%-80% of natural sugar. Both, fresh jujubes and dried jujubeds contain vitamins and minerals, such as vitamins A, B1, C, niacin, zizyphus acid, carotene, iron, calcium). Thus, jujubes act like a natural dietary supplement.

People are concerned about the jujube containing harmful pesticide residue from farming. In general, pesticides are often used before and after rainy season during the farming process of the jujube. As a precaution, most people peel and wash the jujube before eating to protect their body against harmful pesticides. However, small amounts of pesticide residues can still remain and can be absorbed by the body and can still be harmful to a person. Such pesticides can cause a variety of diseases and are linked to cancer. Therefore, a jujube producing process is needed that reduces the need to use harmful pesticides.

Another problem related to jujubes, the skin of a dried jujube tends to be rough and thick. Traditionally, jujubes are dried in the sun, which creates the tough dried skin. To be more edible and enjoyable as a snack, a drying process is needed that avoids creating such a tough dry skin.

Jujubes have a distinctive texture and taste. Though many people enjoy traditionally dried jujubes as a snack, many people, especially children, find jujubes difficult to eat and not especially enjoyable. Therefore, a manufacturing process is needed that not only creates a jujube snack with an enticing texture, but also creates jujube snacks with pleasing flavors.

Therefore, there is a need for a jujube producing process that reduces the need to use harmful pesticides. There is also a need for a jujube drying process that avoids creating such a tough dry skin and produces a more edible and enjoyable jujube snack. Further, a jujube manufacturing process is needed that not only creates a jujube snack with an enticing texture, but also creates jujube snacks with pleasing flavors. The present invention accomplishes these objectives.

SUMMARY OF THE INVENTION

The present device is a snack-making process for manufacturing jujube snacks includes the following steps. Jujube fruit is harvested from an elevation of between 100 and 6,000 feet above sea level. In an alternate embodiment, the snack-making process the jujube fruit is harvested from an elevation of between 3500 and 6000 feet above sea level. The fruit is air dried for between 30 and 120 days with substantially daily exposure to sunlight. The fruit is rinsed with water. The fruit is air dried naturally between 30 and 60 minutes. The seeds are removed from the fruit. The fruit is sliced into annular slices. The slices are baked for between 240 minutes to 360 minutes at a temperature of between 142 and 194 degrees F. The slices are cooled for between 30 minutes to 60 minutes at a temperature of between 50 and 60 degrees F. The slices are then cooled to below 15 degrees F. while maintaining the water content of the slices to less than 5%.

In an embodiment, the snack-making process includes the step of introducing a flavoring substance to the slices. In one embodiment, the slices are submerged in a coffee concentrate. In another embodiment, the snack-making process includes the step of coating the slices with a blueberry pomegranate mix. In another embodiment, the snack-making process includes the step of coating the slices with a garlic powder. In one more embodiment, the snack-making process includes the step of submerging the slices in a red ginseng concentrate.

The present invention includes a jujube producing process that reduces the need to use harmful pesticides. The invention further includes a jujube drying process that avoids creating a traditionally tough dry skin and instead produces a more enjoyable jujube snack. Further, the invention includes a jujube manufacturing process that creates a jujube snack with an enticing texture. Additionally, the invention creates jujube snacks with pleasing flavors. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
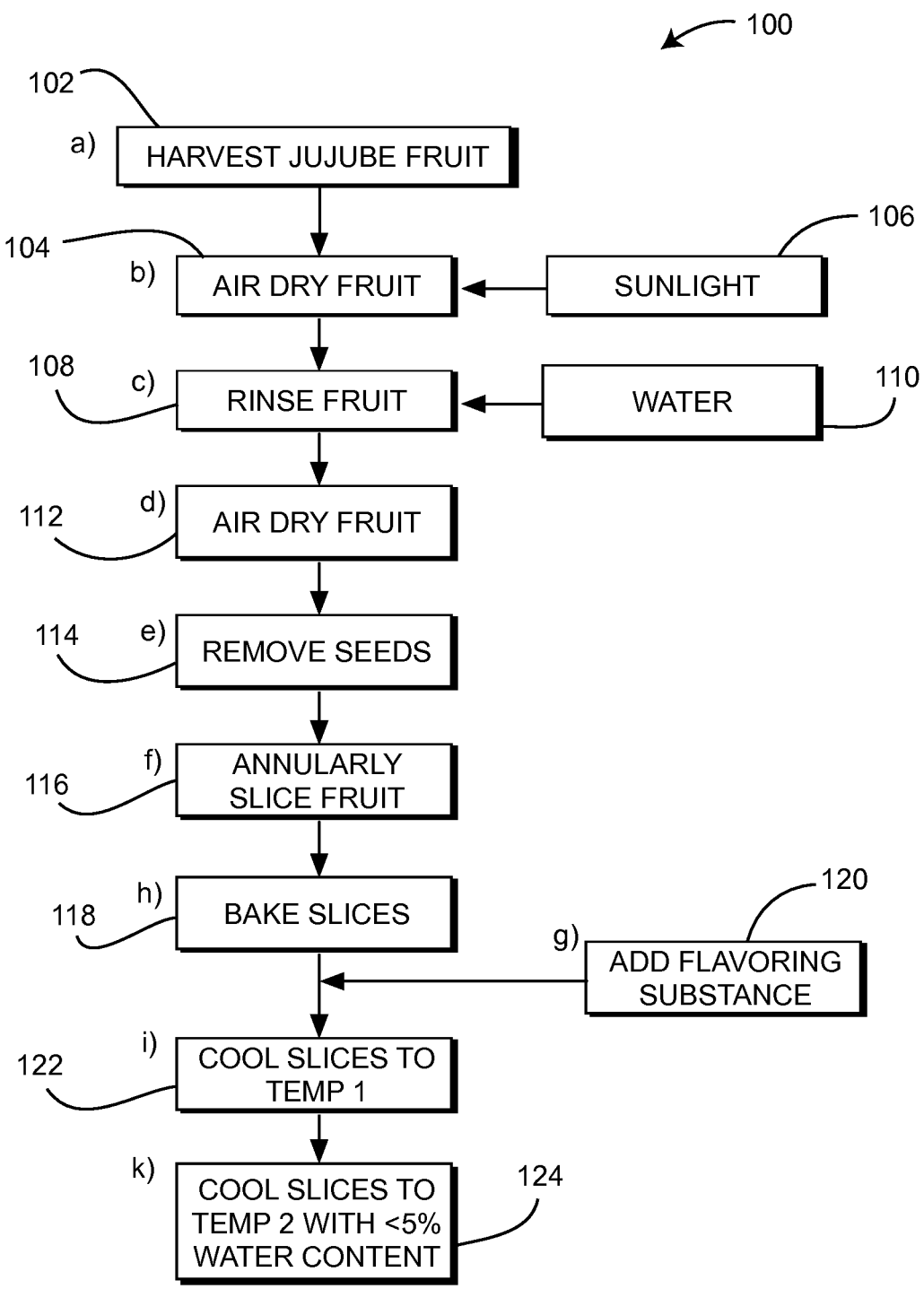
FIG. 1 is a flowchart of a jujube snack-making process.

In FIG. 1, a snack-making process 100 for manufacturing jujube snacks includes the following steps. In one embodiment at step 102, jujube fruit is harvested from jujube trees at an elevation of between 100 and 6,000 feet above sea level. In an alternate embodiment of the harvesting step 102, the jujube fruit is harvested from jujube trees at an elevation of between 3500 and 6000 feet above sea level. In a preferred embodiment of the harvesting step 102, the jujube fruit is harvested from the jujube tree at an elevation approximately 4000 feet above sea level. Growing at these particular elevations, the temperature differential tends to be greater making it difficult for harmful bacteria disease and insects to survive at such altitude conditions. Thus, the need for harmful pesticides is reduced.

In step 104, the fruit is air dried for between 30 and 120 days with substantially daily exposure to sunlight 106. In step 108, the fruit is rinsed with water 110. In step 112, the fruit is air dried naturally between 30 and 60 minutes. In step 114, the seeds are removed from the fruit. In step 116, the fruit is sliced into annular slices. In an embodiment, the fruit is cut in half after the seed is removed. In step 118, the slices are baked for between 240 minutes to 360 minutes at a temperature of between 142 and 194 degrees F. In step 122, the slices are cooled for between 30 minutes to 60 minutes at a temperature of between 50 and 60 degrees F. In step 124, the slices are then cooled to below 15 degrees F. while maintaining the water content of the slices to less than 5%. After the snack-making process 100 is completed, the jujube snacks are ready to be packaged for shipping to stores.

Figure 2:
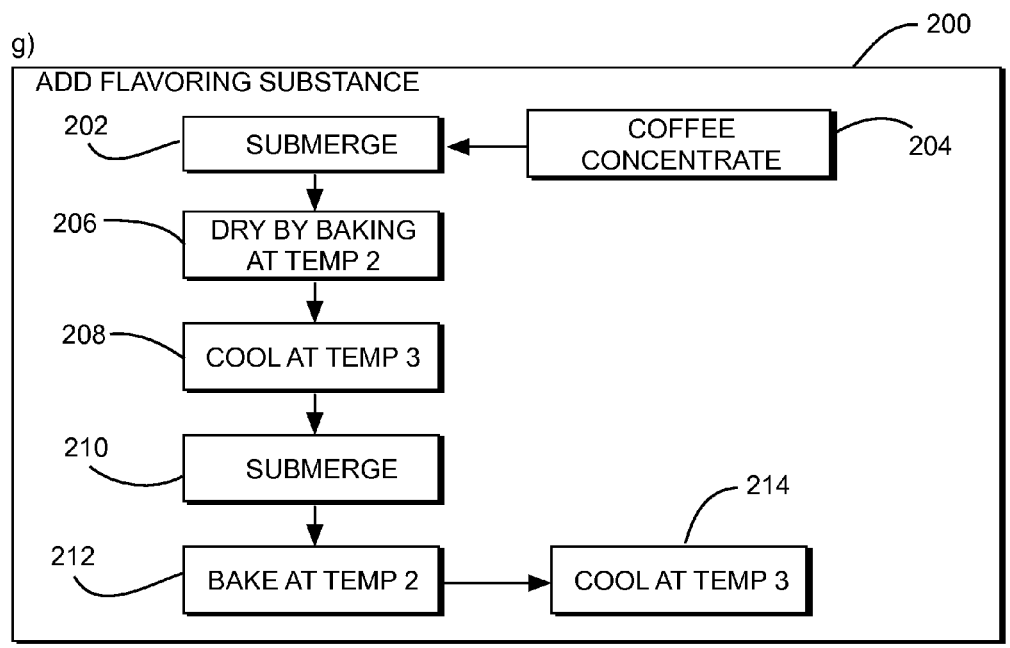
FIG. 2 is a flowchart of submerging slices in a coffee concentrate.

In an embodiment in FIG. 1, the snack-making process 100 includes the step 120 of introducing a flavoring substance to the slices. In FIG. 2, the add flavoring substance step 120 includes an embodiment 200 where the slices are submerged in step 202 in a coffee concentrate 204. In a preferred embodiment, the slices are submerged in the coffee concentrate in a ratio of between 10 ml and 14 ml of the coffee concentrate for every 10 grams of slices, for not more than two minutes. In step 206, the slices are then dried by baking the slices for between 120 minutes to 240 minutes at between 142 to 194 degrees F. In step 208, the slices are cooled for between 30 minutes to 60 minutes at a temperature of between 50 and 60 degrees F. In step 210, the slices are submerged in the coffee concentrate again for no more than 2 minutes. In step 212, the slices are baked for between 180 minutes to 300 minutes at between 142 to 194 degrees F. Then in step 214, the slices are cooled for between 30 minutes to 60 minutes at a temperature of 50 to 60 degrees F.

Figure 3:
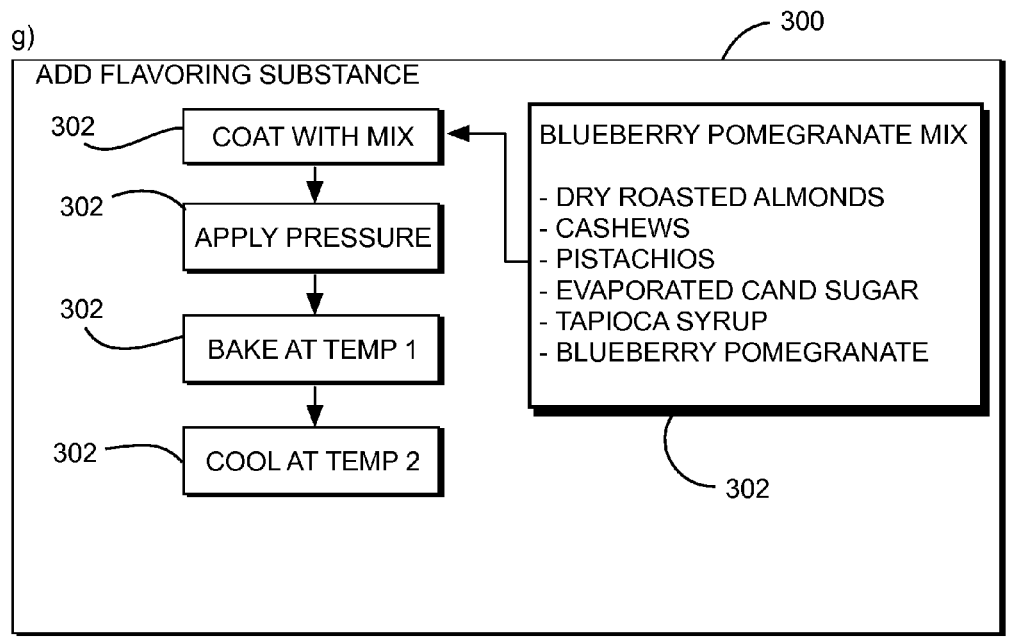
FIG. 3 is a flowchart of coating slices with a blueberry pomegranate mix.

In another embodiment in FIG. 3, the add flavoring substance step 120 includes an embodiment 300 of coating the slices in step 302 with a blueberry pomegranate mix 304. In one embodiment, the blueberry pomegranate mix 304 includes a mixture of dry roasted almonds, cashews, pistachios, evaporated cane sugar, tapioca syrup, blueberry, pomegranate, sea salt, and natural flavors. In step 306, pressure is applied to the coated slices and the blueberry pomegranate mix by compressing each slice and the blueberry pomegranate mix between two sponges. In step 308, the slices are baked for between 120 minutes to 360 minutes at between 142 to 194 degrees F. In step 310, the slices are cooled for between 30 minutes to 60 minutes at a temperature of 50 to 60 degrees F.

Figure 4:
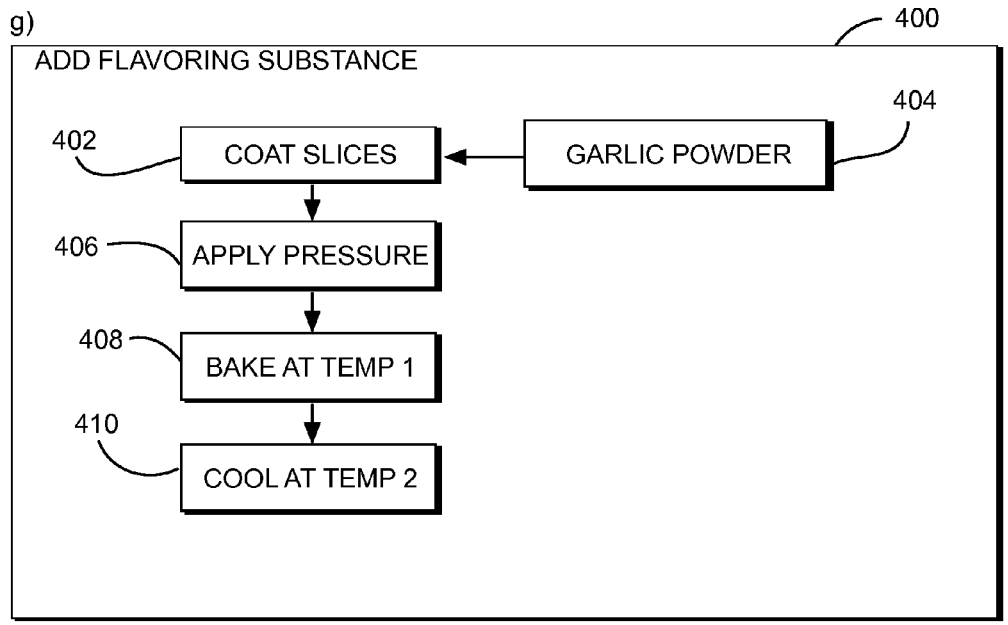
FIG. 4 is a flowchart of coating slices with a garlic powder.

In another embodiment in FIG. 4, the add flavoring substance step 120 includes an embodiment 400 of coating the slices in step 402 with a garlic powder 404. In step 406, pressure is applied to the coated slices and the garlic powder by compressing each slice and the garlic powder between two sponges. In step 408, the slices are baked for between 120 minutes to 360 minutes at between 142 to 194 degrees F. In step 410, the slices are cooled for between 30 minutes to 60 minutes at a temperature of 50 to 60 degrees F.

Figure 5:
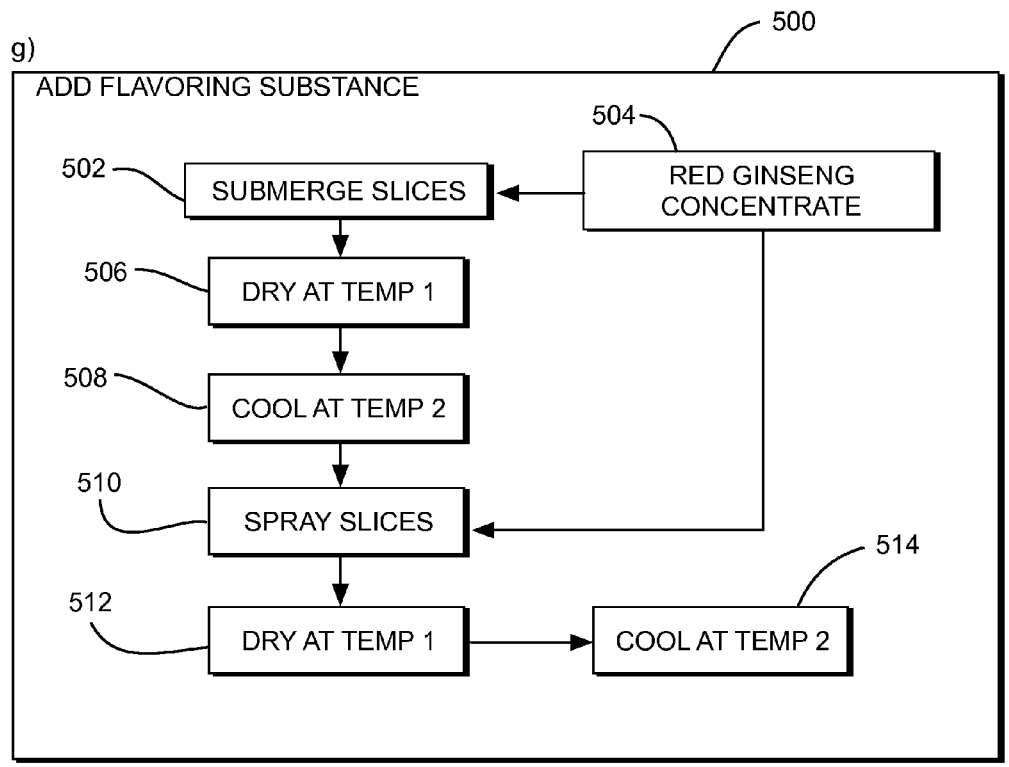
FIG. 5 is a flowchart of submerging slices in a red ginseng concentrate.

In another embodiment in FIG. 5, the add flavoring substance step 120 includes an embodiment 500 of submerging the slices in step 502 in a red ginseng concentrate 504. In one embodiment, the slices are submerged in a ratio of between 25 ml and 35 ml of the red ginseng concentrate for every 10 grams of slices, for not more than one minute. In step 506, the slices are dried by baking the slices for between 120 minutes to 240 minutes at between 142 to 194 degrees F. In step 508, the slices are cooled for between 30 minutes to 60 minutes at a temperature of between 50 and 60 degrees F. In step 510, the slices are then sprayed with the red ginseng concentrate 504. In step 512, the slices are then baked for between 120 minutes to 240 minutes at between 142 to 194 degrees F. In step 514, the slices are cooled for between 30 minutes to 60 minutes at a temperature of 50 to 60 degrees F.

Preferably, the fresh jujubes are categorized into different size grades. In one approach, Grade A is the biggest size, Grade B is a middle size, and Grade C is the smallest size. Preferably, Grade B size jujubes are used to make the jujube snacks. To ensure quality, the selected jujubes preferably go through a second screening process after they are dried.

While a particular form of the invention has been illustrated and described, it will be apparent that various modifications can be made without departing from the spirit and scope of the invention. For example, additional flavoring substances may be added to the jujube slices, such as an almond powder substance. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A snack-making process for manufacturing jujube snacks, comprising: sequential steps a-I, as follows:
   a) harvesting jujube fruit from an elevation of between 100 and 6,000 feet above sea level;
   b) air-drying the jujube fruit for between 30 and 120 days with daily exposure to sunlight;
   c) rinse rinsing the jujube fruit with water;
   d) air-drying the jujube fruit between 30 and 60 minutes;
   e) removing the seeds from the jujube fruit;
   f) slicing the jujube fruit into annular slices;
   introducing a flavoring substance to the annular slices;
   g) bake baking the annular slices for between 240 minutes to 360 minutes at a temperature of
   between 142 and 194 degrees F.;
   h) cooling the annular slices for between 30 minutes to 60 minutes at a temperature of between 50 and 60 degrees F.;
   i) cooling the annular slices to below 15 degrees F. while maintaining the water content of the annular slices to less than 5%.

2. The snack-making process of claim 1, wherein the step of harvesting the jujube fruit occurs at elevations between 3500 and 6,000 feet above sea level.

* * * * *